US006738695B1

(12) United States Patent
Motz et al.

(10) Patent No.: US 6,738,695 B1
(45) Date of Patent: May 18, 2004

(54) SYSTEM AND METHOD FOR INITIALIZING AUTOGUIDANCE FOR A MOBILE MACHINE

(75) Inventors: Darin S. Motz, Earlville, IL (US); Andrew L. Saxsma, Morton, IL (US); Michael D. Staub, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/320,265

(22) Filed: Dec. 16, 2002

(51) Int. Cl.$^{7}$ .................................................. G06F 19/00

(52) U.S. Cl. ........................ 701/23; 701/41; 56/10.2 R; 56/DIG. 15; 342/357.06; 180/168

(58) Field of Search .......................... 701/23, 213, 209, 701/26, 50, 41, 43, 200, 42, 44; 56/10.2 A, 10.2 F, 10.2 R, DIG. 15; 342/357.06, 357.17; 318/581; 180/131, 168, 79.1, 422; 172/2

(56) References Cited

U.S. PATENT DOCUMENTS

| | | | | |
|---|---|---|---|---|
| 4,299,483 A | | 11/1981 | Grove et al. | |
| 4,482,960 A | | 11/1984 | Pryor | |
| 4,769,700 A | | 9/1988 | Pryor | |
| 4,777,785 A | * | 10/1988 | Rafaels | 56/10.2 A |
| 4,835,691 A | | 5/1989 | Rotem et al. | |
| 5,010,719 A | * | 4/1991 | Korthuis | 56/10.2 F |
| 5,224,551 A | | 7/1993 | Sukup | |
| 5,260,875 A | | 11/1993 | Tofte et al. | |
| 5,279,068 A | | 1/1994 | Rees et al. | |
| 5,369,589 A | | 11/1994 | Steiner | |
| 5,828,971 A | * | 10/1998 | Diekhans et al. | 701/41 |
| 5,857,539 A | | 1/1999 | Diekhans et al. | |
| 5,911,669 A | | 6/1999 | Stentz et al. | |
| 5,987,371 A | | 11/1999 | Bailey et al. | |
| 5,991,694 A | | 11/1999 | Gudat et al. | |
| 6,067,782 A | * | 5/2000 | Diekhans | 56/10.2 A |
| 6,088,644 A | | 7/2000 | Brandt et al. | |
| 6,101,795 A | | 8/2000 | Diekhans | |
| 6,128,574 A | | 10/2000 | Diekhans | |
| 6,205,381 B1 | | 3/2001 | Motz et al. | |
| 6,236,916 B1 | | 5/2001 | Staub et al. | |
| 6,236,924 B1 | | 5/2001 | Motz et al. | |
| 6,244,024 B1 | | 6/2001 | Diekhans et al. | |
| 6,314,348 B1 | * | 11/2001 | Winslow | 701/23 |
| 6,345,231 B2 | * | 2/2002 | Quincke | 701/213 |
| 6,356,819 B1 | * | 3/2002 | Winslow | 701/23 |
| 2002/0053442 A1 | * | 5/2002 | Halme et al. | 172/2 |
| 2003/0023356 A1 | * | 1/2003 | Keable | 701/23 |

FOREIGN PATENT DOCUMENTS

DE 000878121 A1 * 11/1998

* cited by examiner

*Primary Examiner*—Thomas G. Black
*Assistant Examiner*—Tuan C To
(74) *Attorney, Agent, or Firm*—Kelsey Milman

(57) ABSTRACT

A system and method for initiating autoguidance on a mobile machine when turning the machine at the end of a path. When an operator moves a steering mechanism of a mobile machine away from a straight travel position, the autoguidance typically deactivates so that the operator can control the machine through the turn. When the operator attempts to activate autoguidance as the turn is completed, the position of the steering mechanism is monitored for a predetermined time interval. If the position of the steering mechanism falls within a predetermined position zone, autoguidance remains activated; otherwise, autoguidance is deactivated. In addition, during the predetermined time interval, the direction of motion of the steering mechanism is monitored; if the direction is, at any time, away from the predetermined position zone, autoguidance is deactivated.

20 Claims, 4 Drawing Sheets

400 ACTIVATE AUTOGUIDANCE
402 SET TIME = 0
404 DETERMINE INITIAL POSITION (POSITION 0) OF STEERING MECHANISM
406 IS TIME = PREDETERMINED TIME ? NO / YES
408 SET TIME = TIME + INCREMENTAL TIME
410 DETERMINE POSITION TIME OF STEERING MECHANISM
412 IS POSITION TIME > POSITION TIME - INCREMENTAL TIME ? NO / YES
414 DEACTIVATE AUTOGUIDANCE
END
416 DETERMINE FINAL POSITION (POSITION PREDETERMINED TIME) OF STEERING MECHANISM
418 IS POSITION PREDETERMINED TIME = DEADBAND POSITION ? NO / YES
420 DEACTIVATE AUTOGUIDANCE
END
END

104
SWITCH
110
STEERING MECHANISM
108
106
AUTOGUIDANCE CONTROL SYSTEM
112
MAIN MACHINE CONTROL MODULE
114
STEERING POSITION SENSOR
118
STEERING SYSTEM
116

FIG-2-

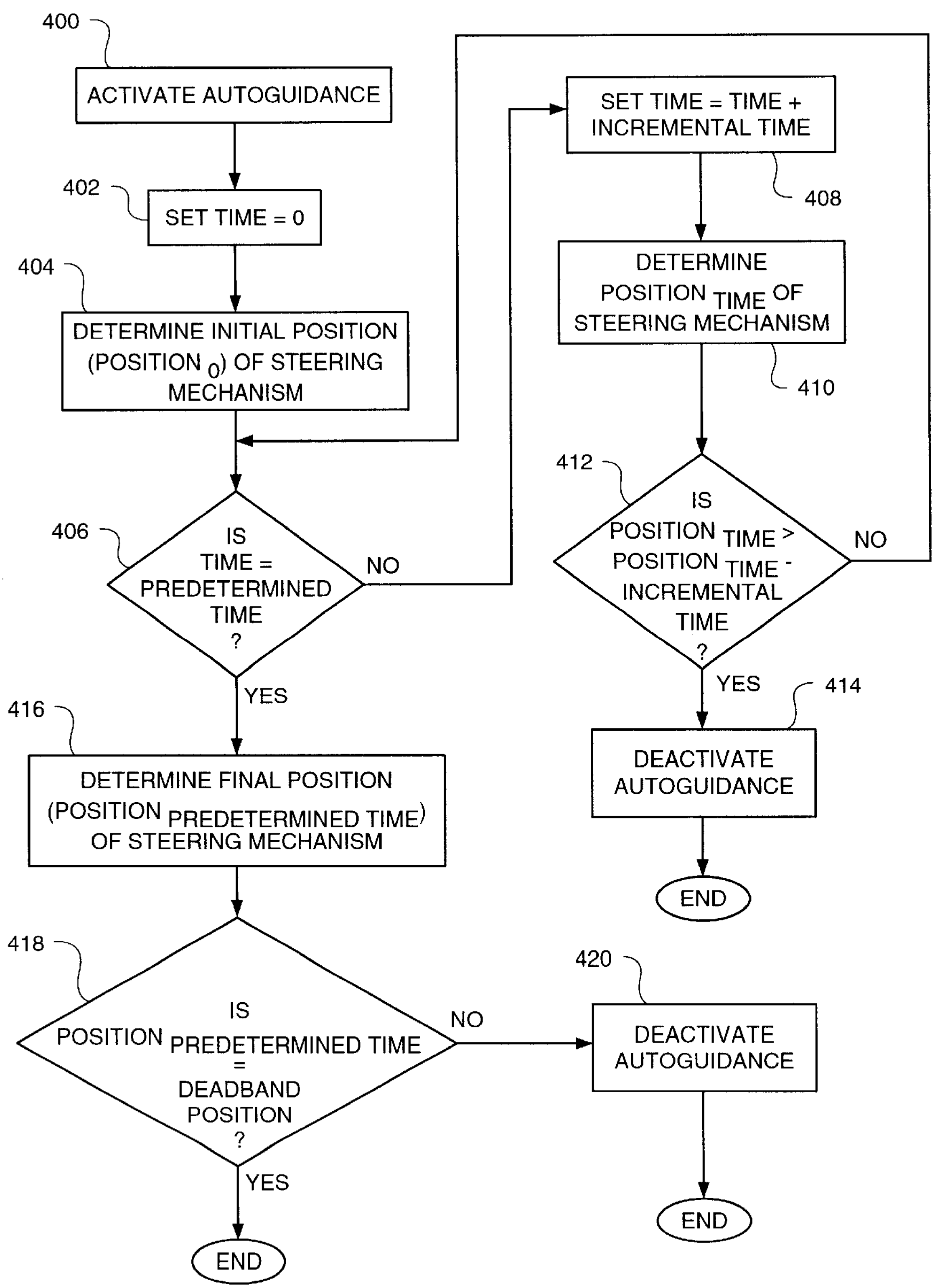
Fig. 4
400
ACTIVATE AUTOGUIDANCE
402
SET TIME = 0
404
DETERMINE INITIAL POSITION (POSITION 0) OF STEERING MECHANISM
406
IS TIME = PREDETERMINED TIME ?
NO
YES
408
SET TIME = TIME + INCREMENTAL TIME
410
DETERMINE POSITION TIME OF STEERING MECHANISM
412
IS POSITION TIME > POSITION TIME - INCREMENTAL TIME ?
NO
YES
414
DEACTIVATE AUTOGUIDANCE
END
416
DETERMINE FINAL POSITION (POSITION PREDETERMINED TIME) OF STEERING MECHANISM
418
IS POSITION PREDETERMINED TIME = DEADBAND POSITION ?
NO
YES
420
DEACTIVATE AUTOGUIDANCE
END
END

SYSTEM AND METHOD FOR INITIALIZING AUTOGUIDANCE FOR A MOBILE MACHINE

TECHNICAL FIELD

This invention relates generally to a system and method for providing autoguidance for a mobile machine and, more particularly, to a system and method for initializing autoguidance at the beginning of a path.

BACKGROUND

Operation of mobile machines often involves time spent guiding the machine in long, straight paths, such as in large mining operations or in agricultural fields. For example, agricultural work often involves long hours in the fields, driving agricultural machines over all portions of each field to perform various tasks, such as seeding, fertilizing, harvesting, tilling, and the like. Such work is highly fatiguing, and chance of error increases dramatically over time. The advent of modern technologies, such as GPS positioning systems, visual guidance systems, and machine control systems, allows for the automation of such repetitious tasks, as seen in U.S. Pat. No. 6,236,916 issued to Staub et al.

However, although autoguidance systems can direct the mobile machine along a defined path, the system, at the end of a path, typically relinquishes control to an operator who turns the machine and positions it for the next path. For example, when the end of the path is reached, the operator is notified by an alert that he or she should assume control of the machine, turn the machine, and again initialize the autoguidance system to guide the machine along the next path.

As the operator turns the machine and moves it into approximate position for the next path, the machine may be angled in relation to the direction of the next path. If the operator initiates autoguidance when the machine is angled, the autoguidance, when it assumes control of the machine, may abruptly turn the machine to bring it onto the defined path; this abrupt turn, or jerk, may be uncomfortable for the operator.

Further, autoguidance systems may not activate when requested if the steering wheel is turned past a predefined zone or not in a "straight-travel" position. For example, if, when the operator is turning the machine for the next path, he or she attempts to initiates autoguidance while the steering wheel is not in the straight travel position, the autoguidance system will attempt to activate, but when the position of the steering mechanism is noted by the system, the autoguidance system will shut down. And, when autoguidance is activated, if the operator turns the steering wheel past a predefined zone, autoguidance typically will automatically deactivate. Thus, when turning the machine at the end of a path, the operator must steer the machine in a straight line and allow the steering mechanism to return to a straight travel position in order for activation of autoguidance to be effective. As the operator may not have been able to position the machine in the proper position to begin the next path due to the need to steer in a straight line, the machine may make an abrupt turn and jerk when the autoguidance assumes control in order to correct the path of travel of the machine.

The present invention is directed to overcoming one or more of the problems as set forth above.

SUMMARY OF THE INVENTION

It is to be understood that both the foregoing general description and the following detailed description are exemplary and explanatory only and are not restrictive of the invention as claimed.

In a first embodiment, a system for initializing autoguidance for a mobile machine is disclosed. The system comprises a steering mechanism for steering the mobile machine; a steering position sensor operatively coupled to the steering mechanism for determining a position of the steering mechanism; and an autoguidance control system operatively coupled to the steering position sensor, the autoguidance control system activating autoguidance, the autoguidance control system receiving a final position signal generated by the steering position sensor indicative of a final position of the steering mechanism and responsively deactivating autoguidance if the final position is not within a predefined deadband zone.

In a second embodiment, a system for initializing autoguidance for a mobile machine is disclosed. The system comprises a steering mechanism for steering the mobile machine; a steering position sensor operatively coupled to the steering mechanism for determining a position of the steering mechanism; and an autoguidance control system adapted to monitor the position of the steering mechanism from at least two position signals received from the steering position sensor, the autoguidance control system activating autoguidance, and the autoguidance control system responsively deactivating autoguidance if the position of the steering mechanism moves away from a predefined deadband zone.

In a third embodiment, a method for initializing autoguidance for a mobile machine is disclosed. The mobile machine preferably has a steering mechanism operatively coupled to the mobile machine. The method comprises the steps of: activating autoguidance for the mobile machine; determining a final position of the steering mechanism; and deactivating autoguidance if the final position is not within a predefined deadband zone.

In a fourth embodiment, a method for initializing autoguidance for a mobile machine is disclosed. The mobile machine has a steering mechanism operatively coupled to the mobile machine. The method comprises the steps of activating autoguidance for the mobile machine; monitoring the position of the steering mechanism in relation to a predefined deadband position; and deactivating autoguidance if a distance between the position of the steering mechanism and the deadband position increases.

BRIEF DESCRIPTION OF THE DRAWINGS

FIG. 4 is a method for activating autoguidance on a mobile machine during a turn.

DETAILED DESCRIPTION

Figure 1:
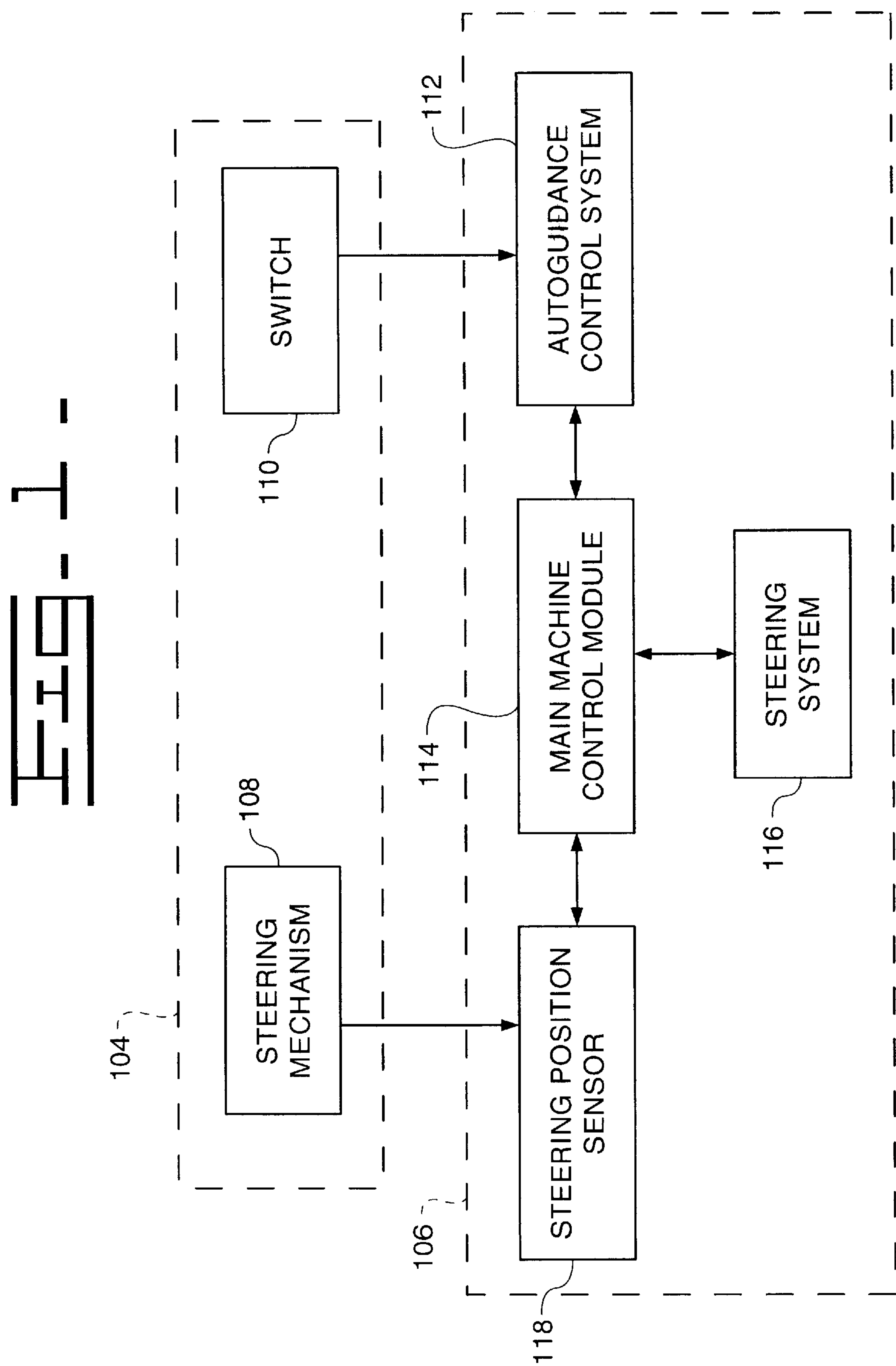
FIG. 1. is a block diagram illustrating a preferred embodiment of the present invention.

Referring to the drawings, a system for providing autoguidance for a mobile machine 102 is shown. Various types of mobile machines 102, e.g., combines, agricultural tractors, mining trucks, chemical applicators, and the like, may be used with embodiments of the present invention. In addition, the present invention is suited for use with many types of mobile machines 102, driven by tracks, wheels, or other means.

With particular reference to FIG. 1, a block diagram illustrating a preferred embodiment of the present invention is shown. The mobile machine 102 preferably comprises an operator control system 104 and a machine system 106. However, even though both the operator control system 104 and the machine system 106 are preferably located on the mobile machine 102, one or both systems 104 or 106, or one or more components of the systems 104 or 106, may be located remotely from the machine 102. The operator control system 104 preferably comprises a steering mechanism 108 and an operator controlled switch 110. The steering mechanism 108 may be used by a machine operator for steering the machine 102 while it is under operator control. The steering mechanism 108 may be comprised of a steering wheel, one or more joysticks, or other means for allowing an operator to control the heading of the machine 102. The switch 110 is preferably located in a position convenient for the machine operator and is used by the operator to activate and deactivate autoguidance of the machine 102. In the preferred embodiment, the switch 110 is a momentary contact on/off switch designed to withstand the harsh environment associated with heavy industrial or agricultural work. However, other means for activating and deactivating autoguidance may be provided to the operator, such as for example a voice recognition system.

The machine system 106 is preferably comprised of an autoguidance control system 112, a main machine module control module 114, an electro-hydraulic steering system 116, and a steering position sensor 118. The autoguidance control system 112 is preferably operatively connected to the switch 110, with the switch 110 providing at least activation and deactivation signals to the autoguidance control system 112. When activated, the autoguidance control system 112 provides autoguidance to the mobile machine 102, as is well known in the art. The autoguidance control system 112 determines the current position and heading of the mobile machine 102 and determines a desired path for the mobile machine 102 to traverse.

The main machine control module 114 controls various functions of the mobile machine 102 including, but not limited to, steering control. Preferably, the main machine control module 114 is operatively connected to the autoguidance control system 112. In the preferred embodiment, the main machine control module 114 is further operatively connected to the electro-hydraulic steering system 116 to control steering of the mobile machine 102 during autoguidance, as is well known in the art.

The steering position sensor 1 18 is preferably operatively connected to the main machine control module 114 and to the steering mechanism 108; the steering position sensor 118 allows the main machine control module 114 to determine the position of the steering mechanism 108 when autoguidance is deactivated and the machine 102 is steered by the operator, such as, for example, during turning at the end of a path or row. The steering position sensor 118 may comprise a set of resolvers, which convert the position of the steering mechanism 108 to electrical, or position, signals, or other means for indicating position. The position signals are preferably delivered to the main machine control module 114. Such control modules, systems, and sensors are well known in the art and will not be discussed further. In addition, the flow of data among these systems may be controlled by multiple data busses, a network bridge, or by other means well known to those skilled in the art.

Figure 2:
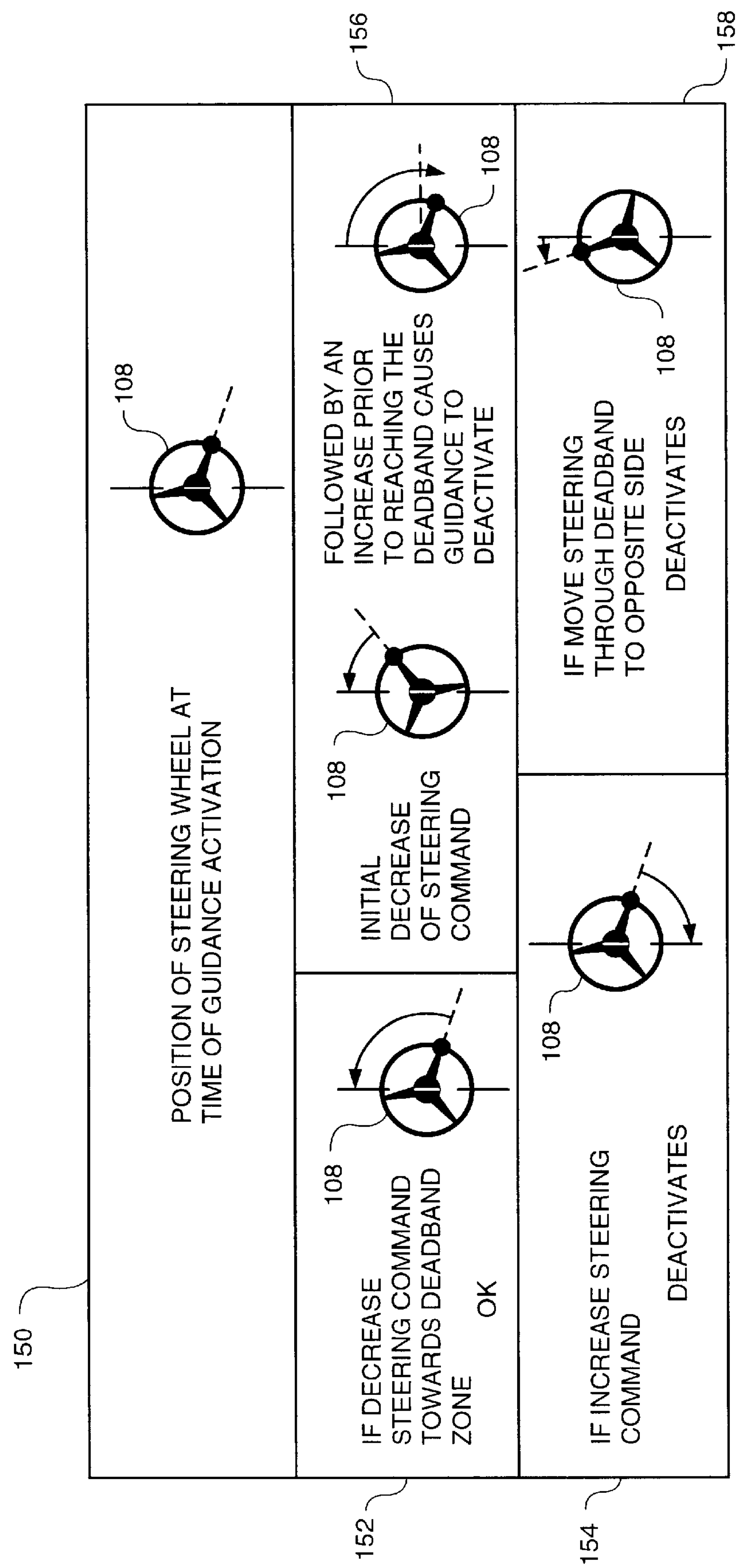
FIG. 2 is a diagram illustrating positions of the steering mechanism in a preferred embodiment of the present invention.

Referring to FIG. 2, the autoguidance activation options are demonstrated. In order to allow the operator to activate autoguidance when turning onto the next path, the system allows for autoguidance to be activated when the machine is turning and the steering mechanism is not in a "straight travel" position, also known as a deadband zone. The deadband zone typically does not require absolute straight travel; it is meant to encompass several degrees on either side of a straight travel position to account for small variations in steering. As the operator is able to substantially complete the turn, the abrupt turns and jerks that may be encountered when autoguidance is activated are lessened.

As seen in FIG. 2, the initial position of the steering mechanism 108 is away from its straight travel position, indicating that the machine 102 is in a turn, as seen in block 150. Preferably, within a predetermined time, such as for example a few seconds, or more specifically four seconds, the operator moves the steering mechanism 108 to the deadband zone, and the autoguidance remains activated, as seen in block 152. Alternatively, if the operator turns the steering mechanism 108 such that the distance to the deadband zone increases, the autoguidance deactivates, as seen in block 154. If the operator initially turns the steering mechanism 108 towards the deadband zone and then reverses direction to move away from the deadband zone, the autoguidance deactivates, as seen in block 156. And if the steering mechanism 108 is initially turned away from the deadband zone, autoguidance deactivates, as seen in block 158. Thus, when the operator initiates autoguidance during the turn, he or she has the predetermined time to move the steering mechanism position to the deadband zone while the machine travel is under control of the autoguidance, which in turn lessens any abrupt jerks of the machine.

Figure 3:
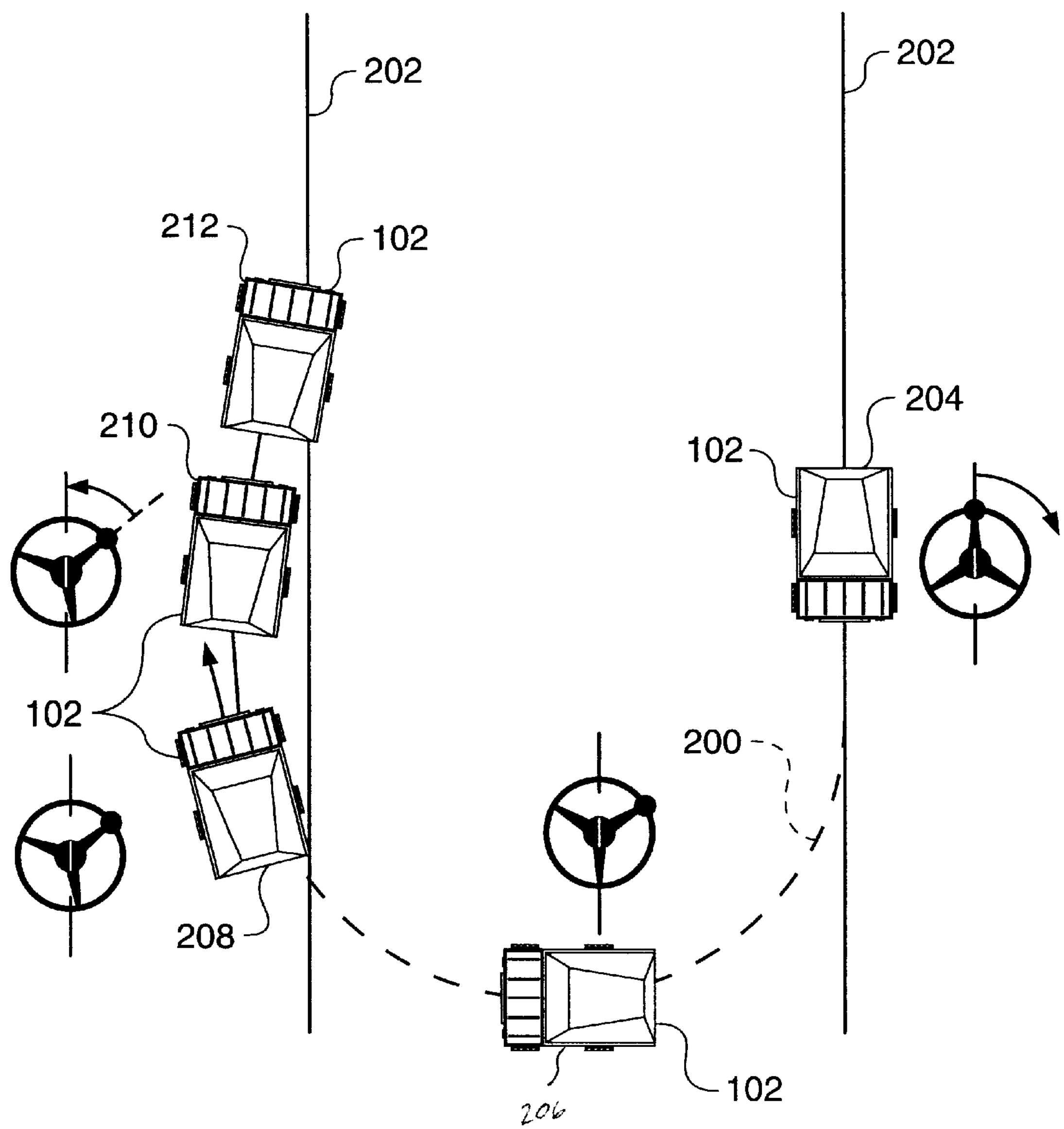
FIG. 3 is a diagrammatic illustration of a turning path of a mobile machine utilizing an embodiment of the present invention.

Referring to FIG. 3, initiating autoguidance during turning is demonstrated. Typically, either prior to or during initial activation of the machine 102, the autoguidance control system 112 has determined the preferred parallel paths 202 to be followed, as is well known in the art. The autoguidance control system 112 steers the mobile machine 102 along one of the pre-defined paths 202. As the end of the path 202 is reached, as seen in the machine position designated 204 in FIG. 2, the operator assumes control of the mobile machine 102 from the autoguidance control system 112, preferably by turning the steering mechanism 108 away from its straight-travel position, and guides the machine 102 into a turn, as seen in machine position 206. As the machine 102 turns and approaches the next pre-defined path 202 as seen in machine position 208, the operator requests autoguidance by activating the switch 110. The autoguidance control system 112 attempts to assume control of the machine 102; however, whether control will be maintained is dependent on the operator's actions in the predetermined time after activating the autoguidance switch. If the steering mechanism 108 is returned to the straight travel position, or deadband zone, within the predetermined time, the autoguidance system 112 remains activated and continues to direct the machine to begin traveling along the next predefined row, as seen in machine positions 210 and 212. Allowing the operator to complete the turn once autoguidance is activated lessens the abrupt jerks which may occur when autoguidance assumes control.

As seen in FIG. 4, a method for activating autoguidance during turning of the mobile machine 102 is disclosed. As seen in control block 400 of FIG. 4, autoguidance is activated. Preferably, autoguidance is activated prior to the turn's being completed so that the steering mechanism 108 is not in the straight travel position. As seen in control block 402, a time variable is set equal to zero. As seen in control block 404, the initial position ($positions_0$) of the steering mechanism 108 is determined. Preferably, the steering position sensor 118 transmits one or more signals to the main machine control module 114 which determines the position of the steering mechanism 108. As seen in first decision block 406, the time variable is evaluated. If the time variable is not equal to the predetermined time, control proceeds to block 408 in which the time variable is incremented. As seen in control block 410, $position_{time}$ (the first position) of the steering mechanism is determined, again by the position sensor 118 transmitting one or more signals to the main machine control module 114. In second decision block 412, it is determined if $position_{time}$ is greater then $position_{time\text{-}incremental\ time}$ (the second position). If so, then, as seen in control block 414, autoguidance is deactivated. Preferably, the operator is notified of the deactivation by an audio signal, a displayed notice, or the like. If $position_{time}$ is not greater then $position_{time\text{-}incremental\ time}$, then control returns to control block 406. Once time is equal to the predetermined time, control proceeds to control block 416 in which the final position ($position_{predetermined\ time}$) is determined, again by the position sensor 118 transmitting one or more signals to the main machine control module 114. In decision block 418, it is determined if the final position is within the deadband zone. If so, control ends, and autoguidance remains activated. If not, as seen in control block 420, autoguidance is deactivated. Preferably, the operator is notified of the deactivation by an audible signal, a displayed notice or the like.

Industrial Applicability

An embodiment of the present invention may be utilized with any mobile machine 102 which has an autoguidance system. The mobile machine 102 may be directed by autoguidance down a path or row. As the machine 102 reaches the end of the path, the operator assumes control of the machine 102 to turn the machine 102 and position it for the next path. Rather than requiring the machine 102 to be traveling in a straight line to activate autoguidance, the operator may activate autoguidance when the machine 102 is completing the turn and the steering mechanism 108 is not in the straight travel position. Autoguidance remains activated as long as the operator returns the steering mechanism 108 to the straight travel position within a predetermined time, such as for example four seconds. Thus, the operator may complete the turn and lessen the jerkiness which results when autoguidance assumes control and the machine 102 is not aligned for the next path It will be readily apparent to those skilled in the art that various changes and modifications of an obvious nature may be made, and all such changes and modifications are considered to fall within the scope of the appended claims. Other embodiments of the invention will be apparent to those skilled in the art from consideration of the specification and practice of the invention as disclosed herein. It is intended that the specification and examples be considered as exemplary only, with a true scope and spirit of the invention being indicated by the following claims and their equivalents.

What is claimed is:

1. A system for initializing autoguidance for a mobile machine, comprising:

a steering mechanism for steering the mobile machine;

a steering position sensor operatively coupled to the steering mechanism for determining a position of the steering mechanism; and an autoguidance control system operatively coupled to the steering position sensor, the autoguidance control system activating autoguidance, the autoguidance control system receiving a final position signal generated by the steering position sensor indicative of a final position of the steering mechanism and responsively deactivating autoguidance if the final position is not within a deadband zone.

2. The system, as set forth in claim 1, wherein the final position is the position of the steering mechanism at a predetermined time.

3. The system, as set forth in claim 2, wherein the predetermined time is four seconds after activation of autoguidance by the autoguidance control system.

4. The system, as set forth in claim 1, wherein the autoguidance control system receives at least a first and a second position signal from the steering position sensor prior to receiving the final position signal indicating first and second positions of the steering mechanism, the autoguidance control system comparing the first and second position signals and responsively deactivating autoguidance if the second position is further from the deadband zone than the first position.

5. The system, as set forth in claim 1, wherein autoguidance is activated by the autoguidance control system upon request by an operator.

6. The system, as set forth in claim 5, wherein the operator requests autoguidance activation by an operator controlled switch.

7. A system for initializing autoguidance for a mobile machine, comprising:

a steering mechanism for steering the mobile machine;

a steering position sensor operatively coupled to the steering mechanism for determining a position of the steering mechanism; and an autoguidance control system adapted to monitor the position of the steering mechanism from at least two position signals received from the steering position sensor, the autoguidance control system activating autoguidance, and the autoguidance control system responsively deactivating autoguidance if the position of the steering mechanism moves away from a deadband zone.

8. The system, as set forth in claim 7, wherein autoguidance is activated by the autoguidance control system upon request by an operator.

9. The system, as set forth in claim 8, wherein the operator requests autoguidance activation by an operator controlled switch.

10. The system, as set forth in claim 7, wherein the at least two position signals include first and second position signals indicative of first and second positions of the steering mechanism, respectively; and wherein the autoguidance control system responsively deactivates autoguidance if the second position is further from the deadband zone than the first position.

11. The system, as set forth in claim 7, wherein the autoguidance control system receives a final position signal generated by the steering position sensor indicative of a final position of the steering mechanism and responsively deactivates autoguidance if the final position is not within a deadband zone, and wherein the final position signal may be equivalent to the second position signal.

12. The system, as set forth in claim 11, wherein the final position is the position of the steering mechanism at a predetermined time.

13. The system, as set forth in claim 12, wherein the predetermined time is four seconds after activation of autoguidance by the autoguidance control system.

14. A method for initializing autoguidance for a mobile machine, a steering mechanism operatively coupled to the mobile machine, comprising the steps of:

activating autoguidance for the mobile machine;

determining a final position of the steering mechanism; and deactivating autoguidance if the final position is not within a predefined deadband zone.

15. The method, as set forth in claim 14, wherein the final position is determined at a predetermined time.

16. The method, as set forth in claim 15, wherein the predetermined time is four seconds after autoguidance is activated.

17. The method, as set forth in claim 15, further including the steps of:

monitoring the position of the steering mechanism; and deactivating autoguidance if a distance between the position of the steering mechanism and the deadband zone increases.

18. A method for initializing autoguidance for a mobile machine, a steering mechanism operatively coupled to the mobile machine, comprising the steps of:

activating autoguidance for the mobile machine;

monitoring the position of the steering mechanism in relation to a predefined deadband zone; and deactivating autoguidance if a distance between the position of the steering mechanism and the deadband zone increases.

19. The method, as set forth in claim 18, wherein the monitoring step includes the step of:

determining first and second positions of the steering mechanism; and wherein the deactivating step includes the step of:

deactivating autoguidance if the second position is further from the deadband zone than the first position.

20. The method, as set forth in claim 18, further including the steps of:

determining a final position of the steering mechanism; and deactivating autoguidance if the final position is not within the deadband zone.

* * * * *